US012779411B2

(12) United States Patent
Wang et al.

(10) Patent No.: US 12,779,411 B2
(45) Date of Patent: Nov. 3, 2026

(54) CIRCULATING KNEADING PULPING SYSTEM

(71) Applicant: ONGOAL TECHNOLOGY CO., LTD., Dongguan (CN)

(72) Inventors: Xie Wang, Dongguan (CN); Hailun Yang, Dongguan (CN); Chao Yuan, Dongguan (CN); Xiaobing Dai, Dongguan (CN); Jie He, Dongguan (CN)

(73) Assignee: ONGOAL TECHNOLOGY CO., LTD., Dongguan (CN)

( * ) Notice: Subject to any disclaimer, the term of this patent is extended or adjusted under 35 U.S.C. 154(b) by 450 days.

(21) Appl. No.: 18/502,472

(22) Filed: Nov. 6, 2023

(65) Prior Publication Data

US 2024/0075436 A1 Mar. 7, 2024

Related U.S. Application Data

(63) Continuation of application No. PCT/CN2023/077007, filed on Feb. 18, 2023.

(30) Foreign Application Priority Data

Sep. 5, 2022 (CN) ......................... 202222362159.0

(51) Int. Cl.
*B01F 25/51* (2022.01)
*B01F 23/50* (2022.01)
(Continued)

(52) U.S. Cl.
CPC .............. *B01F 25/51* (2022.01); *B01F 23/53* (2022.01); *B01F 23/54* (2022.01); *B01F 23/59* (2022.01);
(Continued)

(58) Field of Classification Search
CPC ................................ B01F 25/51; B01F 25/53
(Continued)

(56) References Cited

U.S. PATENT DOCUMENTS 369,747 A * 9/1887 Smith .................. B01F 27/114 366/133
808,599 A * 12/1905 Crichfield ................ B28C 9/00 366/18

(Continued)

FOREIGN PATENT DOCUMENTS

CN 112717795 A 4/2021
CN 106390791 B 6/2021

(Continued)

OTHER PUBLICATIONS

European Search Report issued in counterpart European Patent Application No. EP 23793980.6, dated Oct. 21, 2025.

(Continued)

*Primary Examiner* — David L Sorkin
(74) *Attorney, Agent, or Firm* — Westbridge IP LLC

(57) ABSTRACT

Disclosed is a circulating kneading pulping system, including a pulping machine and a kneading tank; the pulping machine is provided with a powder feed port, a pulping chamber connected to the powder feeding port, and a slurry outlet communicated with the pulping chamber, and the screw rod of the pulping machine is provided in the pulping chamber; the slurry outlet of the pulping machine is connected with the kneading inlet of the kneading tank through a first pipeline, and the kneading tank is equipped with a liquid solvent inlet, and the kneading outlet of the kneading tank is connected with the circulation pulping inlet of the pulping machine through a second pipeline.

9 Claims, 2 Drawing Sheets

(51) Int. Cl.

| | |
|---|---|
| ***B01F 23/53*** | (2022.01) |
| ***B01F 25/53*** | (2022.01) |
| ***B01F 27/271*** | (2022.01) |
| ***B01F 27/724*** | (2022.01) |
| ***B01F 35/21*** | (2022.01) |
| ***B01F 35/71*** | (2022.01) |
| ***B01F 35/92*** | (2022.01) |
| *B01F 35/90* | (2022.01) |

(52) U.S. Cl.
CPC ............ *B01F 25/53* (2022.01); *B01F 27/271* (2022.01); *B01F 27/724* (2022.01); *B01F 35/2117* (2022.01); *B01F 35/7176* (2022.01); *B01F 35/718051* (2022.01); *B01F 35/92* (2022.01); *B01F 2035/98* (2022.01)

(58) Field of Classification Search
USPC .......................................... 366/133, 134, 136
See application file for complete search history.

(56) References Cited

U.S. PATENT DOCUMENTS

| | | | | | |
|---|---|---|---|---|---|
| 1,375,623 | A * | 4/1921 | Bartels | B29C 48/395 425/379.1 |
| 3,058,622 | A * | 10/1962 | Ballestra | G01G 19/22 366/18 |
| 3,198,142 | A * | 8/1965 | Lothes | A21C 1/003 366/136 |
| 3,350,070 | A * | 10/1967 | Dostrup | B28C 7/0481 366/136 |
| 4,896,968 | A * | 1/1990 | Baillie | B01F 33/805 366/38 |
| 4,964,732 | A * | 10/1990 | Cadeo | B01F 35/833 366/159.1 |
| 8,511,886 | B2 * | 8/2013 | Vasshus | E21B 21/062 366/132 |
| 2003/0227814 | A1 * | 12/2003 | Priesnitz | C04B 18/027 106/710 |
| 2008/0003501 | A1 * | 1/2008 | Vincze | H01M 4/20 252/182.1 |
| 2008/0035217 | A1 * | 2/2008 | Hartman | B01F 33/821 366/132 |
| 2022/0212121 | A1 | 7/2022 | Liu et al. | |

FOREIGN PATENT DOCUMENTS

| | | | |
|---|---|---|---|
| CN | 113101855 | A | 7/2021 |
| CN | 215463957 | U | 1/2022 |
| CN | 215463958 | U | 1/2022 |
| CN | 216935792 | U | 7/2022 |
| JP | 2002131209 | A | 5/2002 |
| WO | 0023179 | A1 | 4/2000 |
| WO | 2016004716 | A1 | 1/2016 |

OTHER PUBLICATIONS

International Search Report and Written Opinion issued in corresponding PCT Application No. PCT/CN2023/077007, dated May 22, 2023.

* cited by examiner

CIRCULATING KNEADING PULPING SYSTEM

CROSS-REFERENCE TO RELATED APPLICATIONS

The present application is a continuation application of International Application No. PCT/CN2023/077007, filed on Feb. 18, 2023, which claims priority to Chinese Patent Application No. 202222362159.0, filed on Sep. 5, 2022. The disclosures of the above-mentioned applications are incorporated herein by reference in their entireties.

TECHNICAL FIELD

The present application relates to the technical field of pulping system, in particular to a circulating kneading pulping system.

BACKGROUND

The raw materials of lithium batteries need to be prepared through a pulping machine, and in the process of pulping, it is necessary to use a kneading tank (commonly used ribbon kneading tank) to mix the powder material with a liquid solvent and fully knead, and then the high solid content slurry is extruded through an extruder for use. However, the preparation process of the existing pulping equipment is one-pass, the time is short, and the quality of kneading depends on the length of the screw pulping machine, so that the kneading effect between the powder material and the liquid solvent is poor, and needs to be improved.

SUMMARY

In order to overcome the deficiencies of the related art, the purpose of the present application is to provide a circulating kneading pulping system, which can fully knead the slurry to improve the kneading effect of the slurry.

The purpose of the present application adopts following technical solutions to realize.

A circulating kneading pulping system includes:

a pulping machine provided with a powder feed port, a pulping chamber communicated with the powder feed port, a slurry outlet communicated with the pulping chamber, a screw and a circulation pulping inlet; and a kneading tank provided with a liquid solvent inlet, a kneading inlet and a kneading outlet;

the screw of the pulping machine is sleeved on the pulping chamber; the slurry outlet of the pulping machine is configured to communicate with the kneading inlet of the kneading tank through a first pipeline; and the kneading outlet of the kneading tank is configured to communicate with the circulation pulping inlet of the pulping machine through a second pipeline.

In an embodiment, the circulating kneading pulping system further includes:

a dispersion tank;

the pulping machine is provided with a dispersion chamber configured to accommodate a dispersion stator and a dispersion rotor; the dispersion rotor is in transmission connection with the screw of the pulping machine;

a circulation dispersion outlet of the dispersion tank is configured to communicate with an inlet of the dispersion chamber through a third pipeline, and an outlet of the dispersion chamber is configured to communicate with the circulation dispersion inlet of the dispersion tank through a fourth pipeline;

the kneading outlet of the kneading tank is connected with a fifth pipeline, and the fifth pipeline is connected between two ends of the third pipeline through a first shunt tee; and the third pipeline is connected with a circulation pump.

In an embodiment, the kneading outlet of the kneading tank is respectively connected to the second pipeline and the fifth pipeline through a second shunt tee.

In an embodiment, the second pipeline is connected with a first valve, and the fifth pipeline is connected with a second valve.

In an embodiment, the third pipeline is connected with a third valve and a discharge valve, the third valve is located between the first shunt tee and the dispersion tank, and the discharge valve and the third valve are connected through a third shunt tee.

In an embodiment, the circulating kneading pulping system further includes:

a powder feed assembly provided with a plurality of mutually independent main silos, a plurality of mutually independent auxiliary silos, collection funnel, control valve and rotary discharge valve;

each of the main silos and each of the auxiliary silos are connected with the collection funnel; and the collection funnel, the control valve, the rotary discharge valve and the powder feed port of the pulping machine are connected sequentially.

In an embodiment, each of the main silos and each of the auxiliary silos are equipped with a first weight loss scale.

In an embodiment, the circulating kneading pulping system further includes:

a solvent feed assembly provided with a plurality of liquid tanks;

the liquid tank is connected with a second weight loss scale or a mass flow meter, and each of the liquid tanks is connected with the kneading tank.

In an embodiment, each of the liquid tanks is connected with a suction pump.

In an embodiment, the pulping machine is provided with a cooling chamber, and the cooling chamber is configured to surround a periphery of the pulping chamber.

Through the external circulation between the pulping machine and the kneading tank, the powder material and the liquid solvent can be fully kneaded to increase the solid content of the slurry. Moreover, the screw of the pulping machine is used as a power source to stir and propel the slurry, so that it can also be used as a power source for external circulation kneading of the slurry, achieving dual purposes. In particular, the traditional principle of using a screw for centrifugal discharge is only suitable for the kneading of materials with medium and low solid content, and cannot realize the kneading of materials with high solid content; while the screw based on the pulping machine reciprocally sends the slurry with high solid content into the kneading tank, so that the slurry can be diluted, which solves the problem of blockage caused by the slurry with high solid content flowing through the subsequent dispersion chamber.

DETAILED DESCRIPTION OF THE EMBODIMENTS

Below, the present application will be further described with reference to the accompanying drawings and embodiments. It should be noted that, on the premise that there is no conflict, each embodiment or each technical feature described below can be arbitrarily combined to form a new embodiment.

It should be noted that when an element is referred to as being "fixed" to another element, it can be directly on the other element, or intervening elements may also be present. When an element is referred to as being "connected to" another element, it can be directly connected to the other element or intervening elements may be present. "vertical", "horizontal", "left", "right" and similar expressions used herein are for illustration purposes only and do not represent the only implementation manner.

Unless otherwise defined, all technical and scientific terms used herein have the same meanings as commonly understood by those skilled in the art. The terms used in the description of the present application herein are only for the purpose of describing embodiments, and are not intended to limit the present application. As used herein, the term "and/or" includes any and all combinations of one or more of the associated listed items.

Figure 1:
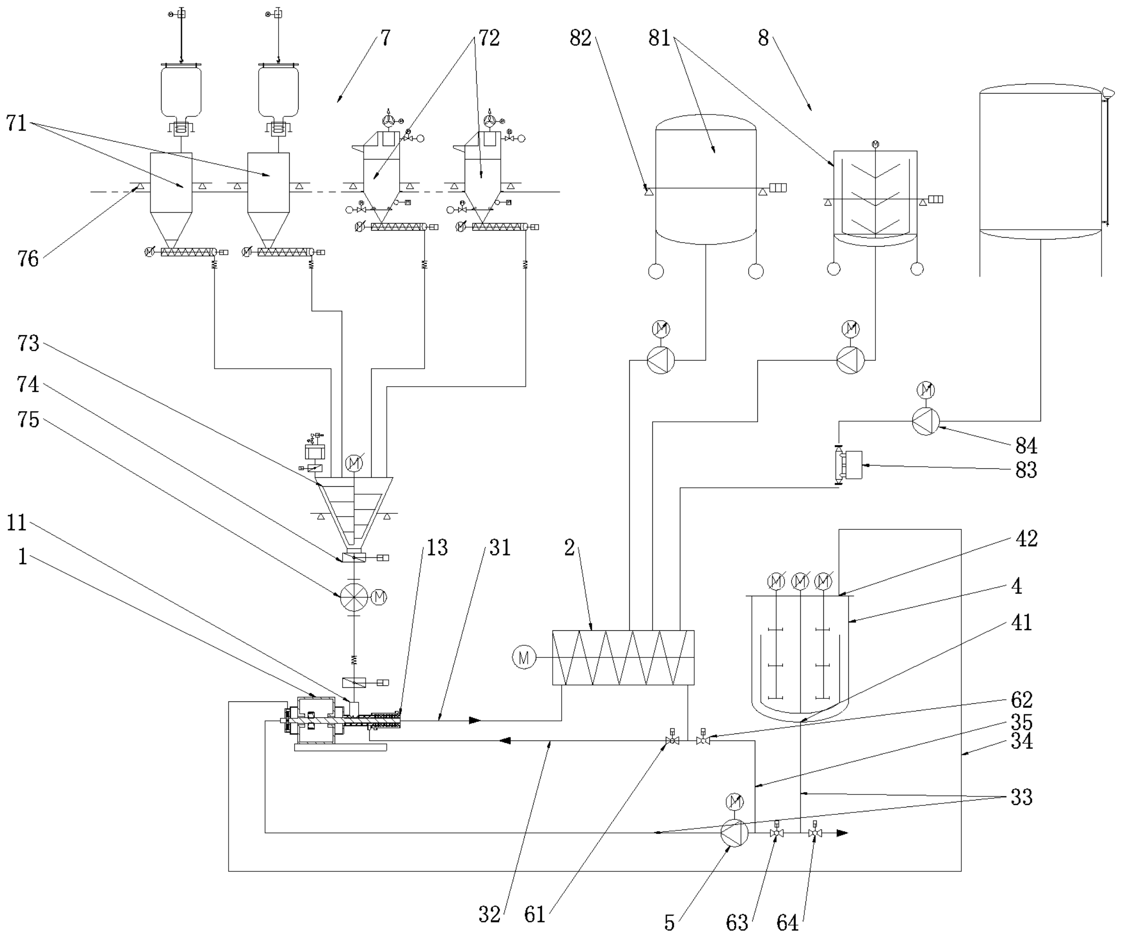
FIG. 1 is a schematic structural diagram of the circulating kneading pulping system according to the present application.
Figure 2:
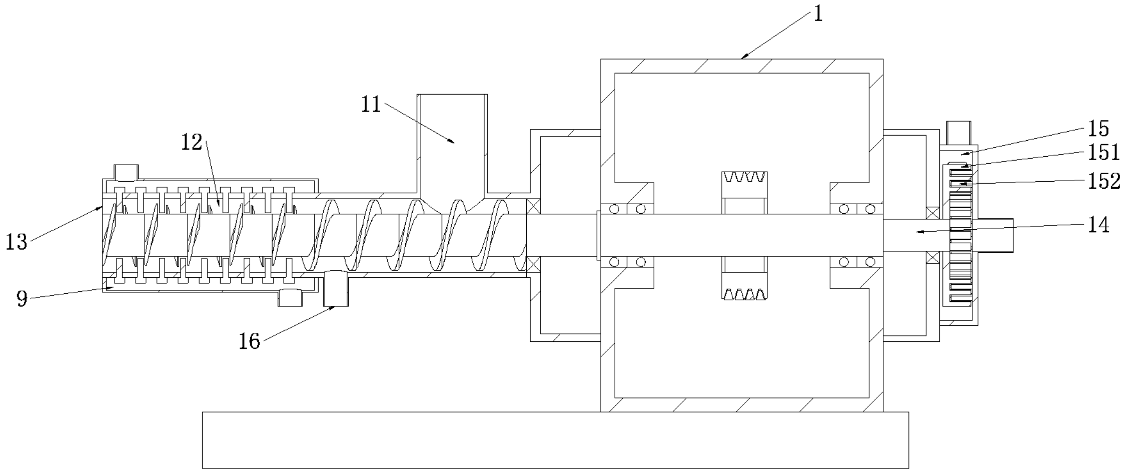
FIG. 2 is a schematic structural diagram of the pulping machine of FIG. 1.

FIGS. 1 to 2 show a circulating kneading pulping system in an embodiment of the present application, including a pulping machine 1 and a kneading tank 2. The pulping machine 1 is provided with a powder feed port 11, a pulping chamber 12 communicated with the powder feed port 11, and a slurry outlet 13 communicated with the pulping chamber 12. The screw 14 of the pulping machine 1 is provided in the pulping chamber 12; the slurry outlet 13 of the pulping machine 1 is connected to the kneading inlet of the kneading tank 2 through the first pipeline 31. The kneading tank 2 is provided with a liquid solvent inlet, and the kneading outlet of the kneading tank 2 is communicated with the circulation pulping inlet 16 of the pulping machine 1 through the second pipeline 32.

During operation, the powder is fed into the pulping machine 1 from the powder feed port 11. When the powder is pushed into the kneading tank 2 along the first pipeline 31 by the screw 14, liquid solvent is injected into the solvent inlet of the kneading tank 2, and then the kneading tank 2 is started. The kneading tank 2 (such as the conventional ribbon kneading tank 2) fully kneads the powder material and the liquid solvent to form a slurry. Then, under the continuous thrust of the screw 14, the slurry coming out of the kneading tank 2 flows into the circulation pulping inlet 16 along the second pipeline 32, and then the slurry is stirred and kneaded cyclically, thereby forming a slurry with high solid content to improve the kneading effect.

Obviously, through external circulation between the pulping machine 1 and the kneading tank 2, the powder material and the liquid solvent can be fully kneaded to increase the solid content of the slurry. Furthermore, the screw 14 of the pulping machine 1 is used as a power source to stir and propel the slurry, thereby also serving as a power source for external circulation and kneading of the slurry, thus achieving two uses. In particular, the traditional principle of using screw 14 for centrifugal discharge is only suitable for kneading materials with medium and low solid content, and cannot knead materials with high solid content; while the screw 14 based on the pulping machine 1 reciprocally sends the slurry with high solid content into the kneading tank 2, so that the slurry can be diluted, which solves the problem of blockage caused by the slurry with high solid content flowing through the subsequent dispersion chamber 15.

In some embodiments, the pulping machine 1 is provided with a dispersion chamber 15. The dispersion chamber 15 houses a dispersion stator 151 and a dispersion rotor 152. The dispersion rotor 152 is drivingly connected to the screw 14 of the pulping machine 1; in this way, the power of the screw 14 is used to simultaneously drive the dispersion rotor 152 so that the number of power sources can be saved. The circulating kneading pulping system also includes a dispersion tank 4 (the dispersion tank 4 is a mature product and is also equipped with a stator and a rotor for dispersing slurry). The circulation dispersion outlet 41 of the dispersion tank 4 is communicated with the inlet of the dispersion chamber 15 through the third pipeline 33. The outlet of the dispersion chamber 15 is communicated with the circulation dispersion inlet 42 of the dispersion tank 4 through the fourth pipeline 34. The kneading outlet of the kneading tank 2 is connected to a fifth pipeline 35. The fifth pipeline 35 is connected between the two ends of the third pipeline 33 through the first shunt tee; the third pipeline 33 is connected to the circulation pump 5. It should be noted that the dispersion stage is located after the kneading stage, that is, after the kneading is completed, the slurry is dispersed to improve the performance of the slurry. With this arrangement, external circulation can be carried out between the dispersion chamber 15 and the dispersion tank 4 under the action of the circulation pump 5. The process is: first, from third pipeline 33 to dispersion chamber 15; then, from dispersion chamber 15 to fourth pipeline 34; then, from fourth pipeline 34 to dispersion tank 4; finally, from dispersion tank 4 to third pipeline 33. In this way, the dual dispersion zones of the dispersion chamber 15 and the dispersion tank 4 can be utilized for sufficient dispersion, further improving the dispersion efficiency of the slurry.

In some embodiments, the kneading outlet of the kneading tank 2 is respectively connected to the second pipeline 32 and the fifth pipeline 35 through a second shunt tee. Arranged like this, offering more openings in kneading tank 2 can be avoided. At this time, in an embodiment, the second pipeline 32 is connected with the first valve 61, and the fifth pipeline 35 is connected with the second valve 62. During the kneading stage of the cycle, the first valve 61 is opened and the second valve 62 is closed, so as to prevent the slurry from entering the third pipeline 33. During the dispersion stage of the cycle, the first valve 61 is closed and the second valve 62 is opened, thereby preventing the slurry from entering the kneading tank 2 again along the second pipeline 32, so as to facilitate the kneading tank 2 to cleanly discharge the slurry inside into the third pipeline 33; after the first pipeline 31, the second pipeline 32 and the kneading tank 2 have drained the slurry as much as possible (at this time, the principle of negative gas pressure can be used), the second valve 62 is also closed at the same time, and then the cycle of the dispersion stage continues.

In some embodiments, the third pipeline 33 is connected with a third valve 63 and a discharge valve 64. The third valve 63 is located between the first shunt tee and the dispersion tank 4. The discharge valve 64 and the third valve 63 are connected by a third shunt tee. With this arrangement, after the slurry is kneaded and dispersed, the slurry can be more completely discharged from the dispersion tank 4 by closing the third valve 63 and opening the discharge valve 64.

In order to make this circulating kneading pulping system come with a powder feed assembly 7, the circulating kneading pulping system also includes a powder feed assembly 7. The powder feed assembly 7 includes a plurality of mutually independent main silos 71, a plurality of mutually independent auxiliary silos 72, collection funnel 73, control valve 74 and rotary discharge valve 75. Each main silo 71 and each auxiliary silo 72 are connected to the collection funnel 73, and the collection funnel 73, the control valve 74, the rotary discharge valve 75, and the powder feed port 11 of the pulping machine 1 are connected in sequence. In some embodiments, each main silo 71 and each auxiliary silo 72 are equipped with a first weight loss scale 76. Among them, the rotary discharge valve 75 cannot be closed, but the opening size of the feeding can be adjusted to control the feeding speed of the powder material.

In order to make this circulating kneading pulping system come with a solvent feed assembly 8, the circulating kneading pulping system also includes a solvent feed assembly 8. The solvent feed assembly 8 includes a plurality of liquid tanks 81, and the liquid tanks 81 are connected with a second weight loss scale 82 or a mass flow meter 83, and each liquid tank 81 is connected to the kneading tank 2. In some embodiments, each liquid tank 81 is connected to a suction pump 84.

In some embodiments, the pulping machine 1 is provided with a cooling chamber 9, which surrounds the periphery of the pulping chamber 12 and cools the pulping machine 1 to avoid damage to the slurry due to high temperature.

The above-mentioned embodiments are only some embodiments of the present application and cannot be used to limit the scope of protection of the present application. Any non-substantive changes and substitutions made by those skilled in the art on the basis of the present application shall belong to the scope of protection required by the present application.

What is claimed is:

1. A circulating kneading pulping system, comprising:

a pulping machine provided with a powder feed port, a pulping chamber communicated with the powder feed port, a slurry outlet communicated with the pulping chamber, a screw and a circulation pulping inlet; and a kneading tank provided with a liquid solvent inlet, a kneading inlet and a kneading outlet;

wherein, the screw of the pulping machine is provided in the pulping chamber; the slurry outlet of the pulping machine is configured to communicate with the kneading inlet of the kneading tank through a first pipeline; and the kneading outlet of the kneading tank is configured to communicate with the circulation pulping inlet of the pulping machine through a second pipeline;

wherein the circulating kneading pulping system further comprises:

a dispersion tank;

wherein, the pulping machine is provided with a dispersion chamber configured to accommodate a dispersion stator and a dispersion rotor; the dispersion rotor is in transmission connection with the screw of the pulping machine;

a circulation dispersion outlet of the dispersion tank is configured to communicate with an inlet of the dispersion chamber through a third pipeline, and an outlet of the dispersion chamber is configured to communicate with the circulation dispersion inlet of the dispersion tank through a fourth pipeline;

the kneading outlet of the kneading tank is connected with a fifth pipeline, and the fifth pipeline is connected between two ends of the third pipeline through a first shunt tee; and the third pipeline is connected with a circulation pump.

2. The circulating kneading pulping system according to claim 1, wherein the kneading outlet of the kneading tank is respectively connected to the second pipeline and the fifth pipeline through a second shunt tee.

3. The circulating kneading pulping system according to claim 2, wherein the second pipeline is connected with a first valve, and the fifth pipeline is connected with a second valve.

4. The circulating kneading pulping system according to claim 2, wherein the third pipeline is connected with a third valve and a discharge valve, the third valve is located between the first shunt tee and the dispersion tank, and the discharge valve and the third valve are connected through a third shunt tee.

5. The circulating kneading pulping system according to claim 1, further comprising:

a powder feed assembly provided with a plurality of mutually independent main silos, a plurality of mutually independent auxiliary silos, a collection funnel, a control valve and a rotary discharge valve;

wherein each of the main silos and each of the auxiliary silos are connected with the collection funnel; and the collection funnel, the control valve, the rotary discharge valve and the powder feed port of the pulping machine are connected sequentially.

6. The circulating kneading pulping system according to claim 5, wherein each of the main silos and each of the auxiliary silos are equipped with a first weight loss scale.

7. The circulating kneading pulping system according to claim 1, further comprising:

a solvent feed assembly provided with a plurality of liquid tanks;

wherein the liquid tank is connected with a second weight loss scale or a mass flow meter, and each of the liquid tanks is connected with the kneading tank.

8. The circulating kneading pulping system according to claim 7, wherein each of the liquid tanks is connected with a suction pump.

9. The circulating kneading pulping system according to claim 1, wherein the pulping machine is provided with a cooling chamber, and the cooling chamber is configured to surround a periphery of the pulping chamber.

* * * * *